United States Patent [19]

Ishikawa et al.

[11] 4,401,310
[45] Aug. 30, 1983

[54] VEHICLE LEVEL REGULATOR CONTROL SYSTEM

[75] Inventors: Hiroshi Ishikawa, Zama; Sachio Satake, Yokohama, both of Japan

[73] Assignees: Nissan Motor Company, Limited, Yokohama; Atsugi Motor Parts Company, Limited, Atsugi, both of Japan

[21] Appl. No.: 286,460

[22] Filed: Jul. 24, 1981

[30] Foreign Application Priority Data

Sep. 27, 1980 [JP] Japan .......................... 55-137881[U]

[51] Int. Cl.³ .............................................. B60G 17/00
[52] U.S. Cl. ...................................... 280/6.1; 280/707; 280/DIG. 1
[58] Field of Search ............... 280/6 R, 6.1, 703, 707, 280/DIG. 1; 340/52 R, 53

[56] References Cited

U.S. PATENT DOCUMENTS

| | | | |
|---|---|---|---|
| 3,653,676 | 4/1972 | Higginbotham | 280/6 P |
| 3,873,123 | 3/1975 | Joneleit | 280/707 |
| 3,881,743 | 5/1975 | Whelan | 280/124 F |
| 4,017,099 | 4/1977 | Hegel et al. | 280/707 |
| 4,105,216 | 8/1978 | Graham et al. | 280/6 R |
| 4,162,083 | 7/1979 | Zabler et al. | 280/703 |
| 4,164,664 | 8/1979 | Kasiewicz | 280/707 |
| 4,185,845 | 1/1980 | Misch et al. | 280/DIG. 1 |
| 4,327,936 | 5/1982 | Sekiguchi | 280/711 |

FOREIGN PATENT DOCUMENTS 55-109196   7/1980   Japan .

*Primary Examiner*—Joseph F. Peters, Jr.
*Assistant Examiner*—Ross Weaver
*Attorney, Agent, or Firm*—Lane, Aitken & Kananen

[57] ABSTRACT

A vehicle level regulator control system controls the vehicle level regulator to improve the response characteristics of the suspension member in response to the vehicle level detector. The control system includes a means for resetting the preset in the delay means for directly activating the suspension member responsive to the vehicle level detector signal when the starter switch is turned on.

9 Claims, 2 Drawing Figures

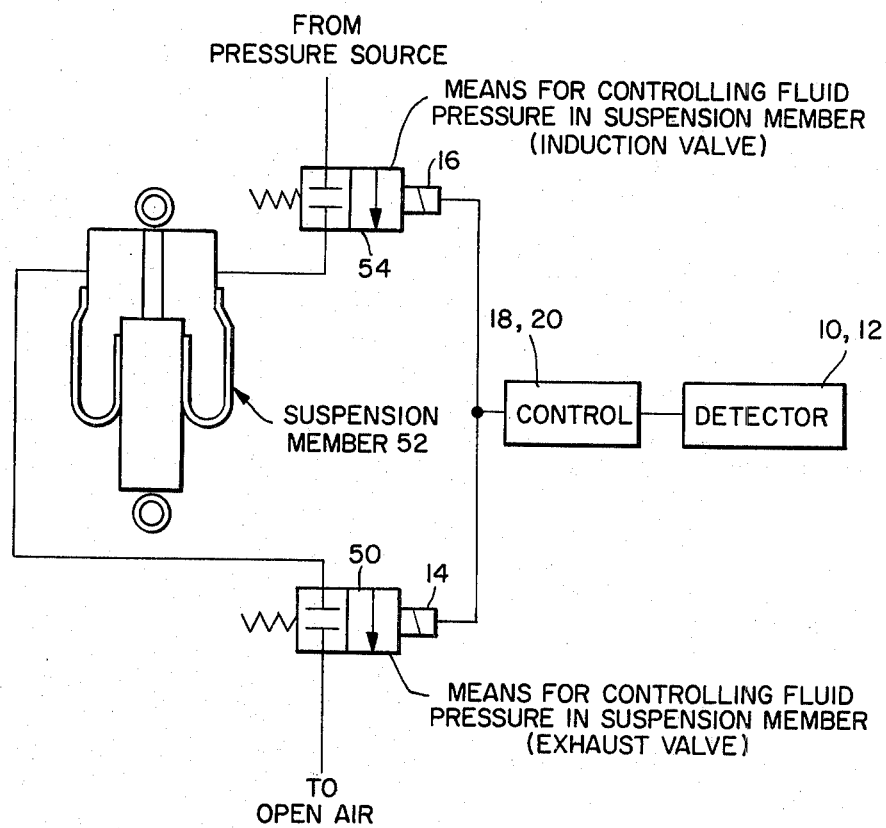

VEHICLE LEVEL REGULATOR CONTROL SYSTEM

BACKGROUND OF THE INVENTION

The present invention relates generally to a vehicle level regulator for an automotive vehicle. More specifically, the invention relates to a control system of the vehicle level regulator for improving the response characteristic of the suspension member of the vehicle when a starter switch for the vehicle is turned on.

The vehicle level regulator for regulating the vehicle level in use with a hydraulic and/or pneumatic suspension member has been known and applied to a vehicle suspension. Generally, the vehicle level regulator includes a vehicle level detector which produces signals indicative of the vehicle level lower than a predetermined lower level and higher than a predetermined upper level, and an actuator for operating the suspension member in response to the vehicle level detector signals. For preventing the vehicle from giving a rough ride, the vehicle level regulator incorporates a means for providing a lag in the response of the suspension member responsive to the vehicle level detector signals. This delay means is effective to prevent the suspension member from repeatedly bounding and rebounding. However, on the other hand, the delay means interrupts the suspension member in following an abrupt varying of a load applied to the vehicle suspension. Namely, when the passengers enter or leave the vehicle, the vehicle suspension can not rapidly follow the variation in the load to regulate the vehicle level due to the lag provided by the delay means. This degrades the starting characteristics of the vehicle.

SUMMARY OF THE INVENTION

Therefore, it is an object of the present invention to provide a control system of a vehicle level regulator for improving response characteristics of a suspension member corresponding to variations of the vehicle level, upon a starter switch being turned on.

To accomplish the above-mentioned and other objects, there is provided a vehicle level regulator control system, according to the present invention, which controls the vehicle level regulator to improve the response characteristics of the suspension member in response to the vehicle level detector. The control system includes a means for resetting the preset in the delay means for directly activating the suspension member responsive to the vehicle level detector signal.

According to the preferred embodiment, a control system for a vehicle level regulator comprises a suspension mechanism for suspending the vehicle body with respect to the wheel axle, the suspension mechanism including a suspension member for lifting the vehicle body up and down with respect to the wheel axle and having a means for controlling a fluid pressure in the suspension member corresponding to the relative level of the vehicle body with respect to the wheel axle to regulate the relative level of the vehicle body with respect to the wheel axle within a predetermined range, an actuator for controlling the operation of said fluid pressure controlling means for maintaining the vehicle level within the predetermined range, a vehicle level detector for detecting the relative level of the vehicle body with respect to the wheel axle and producing a signal when the relative level of the vehicle body with respect to the wheel axle is out of the predetermined range, a control circuit for transmitting the detector signal to the actuator for operating the actuator for adjustment of the vehicle level to the predetermined range, the control circuit incorporating a delay means for giving a predetermined lag between producing a detector signal and response of the actuator; and a means for temporarily deactivating the delay means for transmission of the detector signal to the actuator without lag, the delay means deactivating being responsive to a predetermined vehicle condition.

BRIEF DESCRIPTION OF THE DRAWING

The invention will be more fully understood from the detailed description of the invention and from the accompanying drawings of a preferred embodiment.

FIG. 2 is a schematic diagram of a prior art vehicle suspension system with which the invention may be used.

DESCRIPTION OF THE PREFERRED EMBODIMENT

Figure 1:
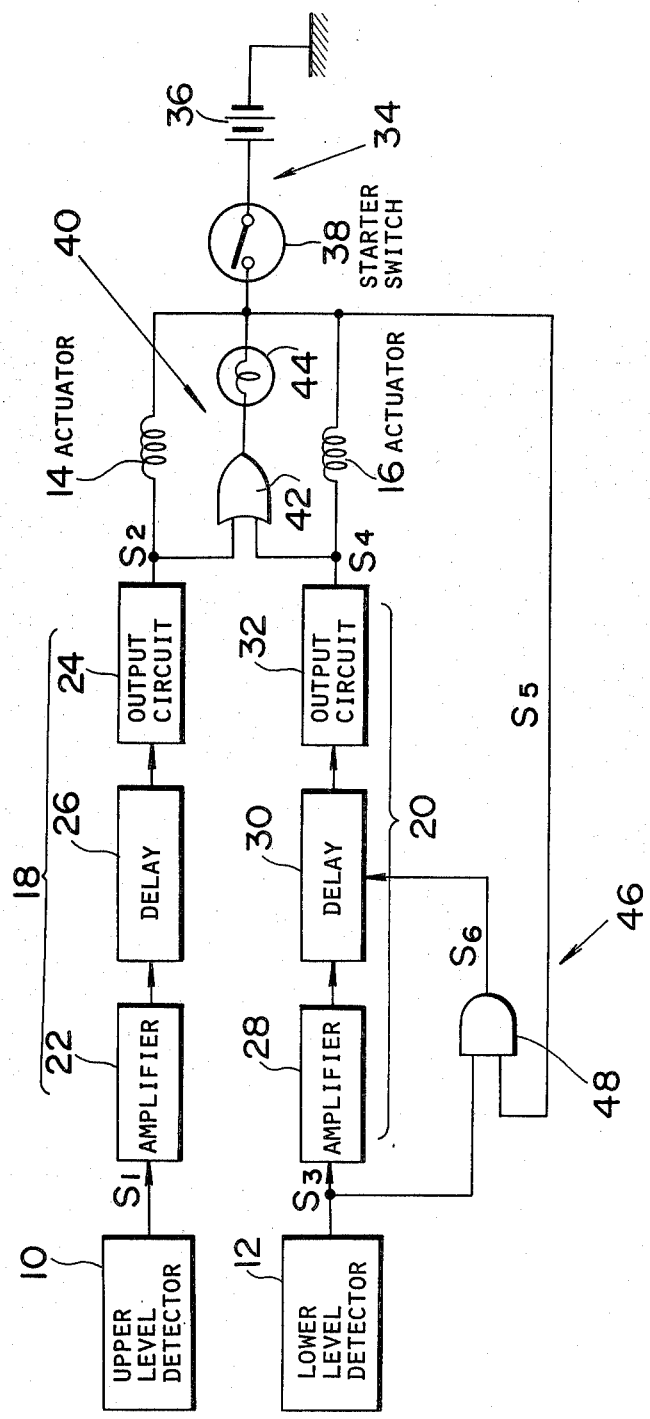
FIG. 1 shows a schematic block diagram of a preferred embodiment of a vehicle level regulator control system according to the present invention.

Referring now to the accompanying drawings, there is illustrated in FIG. 1 a preferred embodiment of a vehicle level regulator control system according to the present invention in the form of a schematic block diagram. In the shown embodiment, upper and lower level detectors 10 and 12 are respectively connected with actuators 14 and 16 via control circuits 18 and 20. The upper level detector 10 detects a vehicle level higher than a predetermined upper level. When the vehicle level bounds up to the predetermined upper level, the upper level detector 10 produces a detector signal $S_1$. The detector signal $S_1$ is inputted to an amplifier 22. The amplifier 22 amplifies the detector signal $S_1$ and outputs the amplified signal. The amplifier output is transferred to an output circuit 24 via a delay timer 26 with a preset time delay. The output circuit 24 outputs an operation signal $S_2$ to the actuator 14 for an exhaust valve 50 of a pneumatic suspension in circuit with a suspension member 52 of the vehicle (see FIG. 2). The actuator 14 operates to open the exhaust valve while the operation signal is present. The exhaust valve 50 opens to flow the air or gas in the pneumatic suspension circuit therethrough to reduce the pressure in the pneumatic suspension to lower the vehicle level. The exhaust valve 50 is kept in an open position by the actuator 14 while the operation signal $S_2$ is provided to the actuator 14 and, in turn, the vehicle level becomes lower than the predetermined upper level.

The amplifier 22, the delay timer 26, and the output circuit 24 constitute the control circuit 18 of the actuator 14 for the exhaust valve.

On the other hand, the lower level detector 12 detects the vehicle level when lower than a predetermined lower level and produces a detector signal $S_3$ while the vehicle level is lower than the predetermined lower level. The detector signal $S_3$ is fed to the actuator 16 via an amplifier 28, a delay timer 30, and an output circuit 32. The output circuit 32 produces an operation signal $S_4$ to be fed to the actuator 16 in response to the detector signal $S_3$ with a given time delay set in the delay timer 30. Similarly to the control circuit 18 of the actuator 14, the control circuit 20 comprises the amplifier 28, the delay timer 30 and the output circuit 32 and operates the actuator 16 with a preset delay time. The actuator 16 operates an inductive valve 54 (shown in FIG. 2) for introducing air or a gas into the pneumatic suspension, while the operation signal S$_4$ is present from the lower level detector 12. The induction valve 54 is kept in an open position by the actuator 16 while the operation signal S$_4$ is provided to the actuator 16 to increase the pressure in the pneumatic suspension to raise the vehicle level until the operation signal S$_4$ has disappeared. The output circuit 32 stops outputting the operation signal S$_4$ when the detector signal S$_3$ has disappeared and, in turn, the vehicle level is recovered to a level higher than the predetermined lower level.

A power supply circuit 34 is connected to both of the actuators 14 and 16 to supply electric power to the upper and lower level detectors 10 and 12 and the control circuits 18 and 20 therethrough. The power supply circuit 34 comprises a battery 36 such as vehicle battery and a starter switch 38 interposed between the battery 36 and the actuators 14 and 16.

An indication circuit 40 is inserted in a parallel relationship with the actuators 14 and 16. The indication circuit 40 comprises an OR gate 42 and a monitor lamp 44. The OR gate 42 is connected with the output circuits 24 and 32 in order to receive therefrom the operation signals S$_2$ and S$_4$. In response to the operation signals S$_2$ and S$_4$, the OR gate 42 terminates the monitor lamp 44.

A timer control circuit 46 is connected to the timer 30 to temporarily inactivate the timer 30 when the lower level detector 12 produces the detector signal S$_3$ and the starter switch 38 is turned on. The timer control circuit 46 comprises an AND gate 48 having terminals respectively connected with the starter switch 38 and the lower level detector 12. When the detector signal S$_3$ and the starter switch on signal S$_5$ becomes an and condition, the AND gate 48 outputs a command S$_6$ for inactivating the delay timer 30, temporarily. By this, the detector signal S$_3$ produced by the lower level detector 12 is directly inputted to the output circuit 32 via the amplifier 28.

Returning to the shown embodiment, if the vehicle level is lowered to lower than the predetermined lower level, the lower level detector 12 produces the detector signal S$_3$ in response thereto. In this condition, when the starter switch is turned on, the AND gate 48 of the timer control circuit 46 produces the command S$_6$ to temporarily inactivate the delay timer 30. Therefore, the output circuit 32 produces the operation signal S$_4$ in response to the detector signal S$_3$ and with no time delay. At this moment, the operation signal S$_4$ is also inputted to the OR gate 42 to terminate the monitor lamp 44.

Responsive to the operation signal S$_4$, the actuator 16 of the induction valve becomes operative to open the valve 54. Thus, the air or gas is introduced into the pneumatic suspension to expand the latter for raising the vehicle level to a given level where the lower level detector stops producing the detector 12 signal S$_3$.

After once the starter switch 38 is turned on, the timer control circuit 46 is maintained in an inoperative condition. Therefore, the delay timer 30 is kept in an operative condition to prevent the pneumatic suspension from repeatedly of bounding and rebounding.

Thus, the invention fulfills all of the objects and advantages sought thereto.

What is claimed is:

1. A control system for a vehicle level regulator comprising:
    a suspension mechanism for suspending the vehicle body with respect to the wheel axle, said suspension mechanism including a suspension member for lifting the vehicle body up and down with respect to the wheel axle and having means for controlling a fluid pressure in said suspension member corresponding to the relative level of the vehicle body with respect to the wheel axle to regulate the relative level of the vehicle body with respect to the wheel axle within a predetermined range;
    an actuator for controlling the operation of said fluid pressure controlling means for maintaining the vehicle level within said predetermined range;
    a vehicle level detector for detecting the relative level of the vehicle body with respect to the wheel axle and producing a signal when the relative level of the vehicle body with respect to the wheel axle is out of said predetermined range;
    a control circuit for transmitting said detector signal to said actuator for operating said actuator for adjustment of the vehicle level to said predetermined range, said control circuit incorporating delay means for providing a predetermined delay time between production of said detector signal and operation of the actuator; and
    means for temporarily deactivating said delay means to transmit the detector signal to said actuator without delay time, said deactivating means being responsive to a predetermined vehicle condition.

2. A control system for a vehicle level regulator comprising:
    a suspension mechanism for suspending the vehicle body on the wheel axle and including a suspension member responsive to the varying of the vehicle level in relation to said wheel axle, said suspension member including means for controlling regulating pressure in said suspension member for regulating the vehicle level with respect to the wheel axle within a predetermined range;
    a vehicle level detector for detecting the relative level of the vehicle body with respect to the wheel axle and producing a detector signal while the detected vehicle level is out of said predetermined range;
    an actuator incorporated with said regulating pressure controlling means to operate the latter, said actuator being responsive to said detector signal to operate said regulating pressure control means for adjusting the regulating pressure in the suspension member to regulate the vehicle level within said predetermined range;
    a control circuit interpositioned between said vehicle level detector and said actuator for transmitting said detector signal to said actuator for operation thereof, said control circuit including a delay means for providing a given delay time for transmission of the detector signal to said actuator; and
    means for temporarily deactivating said delay means in response to an application of power to the control system.

3. A control system for a vehicle level regulator comprising:
    a suspension mechanism for suspending the vehicle body on the wheel axle and including a suspension member responsive to varying the relative level of the vehicle body with respect to the wheel axle, said suspension member connected with a working fluid source via an induction valve and an exhaust valve for introducing and exhausting the fluid to and from the suspension member for regulating the vehicle level;

first and second vehicle level detectors respectively adapted to detect the relative level of the vehicle body with respect to the wheel axle, said first vehicle level detector detecting the vehicle level higher than a given upper limit and producing a first detector signal while the vehicle level is maintained higher than the given upper limit, and said second vehicle level detector detecting the vehicle level lower than a given lower limit and producing a second detector signal while the vehicle level is lower than said lower limit;

first and second actuators respectively incorporated with said induction and exhaust valves, said first actuator being responsive to said first detector signal to actuate the exhaust valve for opening the exhaust valve for reducing the fluid pressure in the suspension member, and said second actuator being responsive to said second detector signal to actuate said induction valve to introduce the working fluid for increasing the fluid pressure in the suspension member;

first and second control circuits respectively interpositioned between said first vehicle level detector and said first actuator, and between said second vehicle level detector and said second actuator for transmitting said first and second detector signals to said first and second actuators, each of said first and second control circuits incorporating delay means for providing a given delay time in response to the detector signal to the actuator; and means for temporarily deactivating one of said delay means in response to the condition of a presence of the detector signal and a signal from a starter switch which is produced upon turning on of the starter switch.

4. A control system as set forth in claim 1, 2 or 3, wherein said suspension member is a pneumatic suspension.

5. A control system as set forth in claim 1, 2 or 3, wherein said means for temporarily deactivating said delay means comprises an AND gate connected with one of said vehicle level detector and a starter switch.

6. A vehicle level regulator system comprising:

first means for detecting a relative displacement of a vehicle body with respect to a wheel axle and producing a detector signal when the vehicle body displacement in relation to the wheel axle exceeds beyond a given range;

second means, responsive to said detector signal, for controlling a vehicle level to maintain the vehicle level within said given range;

third means for receiving said detector signal and feeding said detector signal to said second means with a given delay time; and fourth means for detecting a predetermined vehicle operating condition to disable said third means to feed said detector signal to said second means without said given delay time when said predetermined vehicle condition is detected.

7. The vehicle level regulator system as set forth in claim 6, wherein said third means comprises a first detector adapted to produce a first detector signal when the vehicle body displacement exceeds beyond an upper limit of said given range, and a second detector adapted to produce a second detector signal when the vehicle body displacement relative to said wheel axle is below a lower limit of said given range.

8. The vehicle level regulator system as set forth in claim 7, wherein said second menas is responsive to said first detector signal to lower the vehicle level to said given range and is responsive to said second detector signal to raise the vehicle level to said given range.

9. The vehicle level regulator system as set forth in claim 6, wherein said fourth means is adapted to detect an ON position of a starter switch to produce a disabling signal for disabling said third means.

* * * * *